INVENTOR
ROBERT A. RAMEY JR

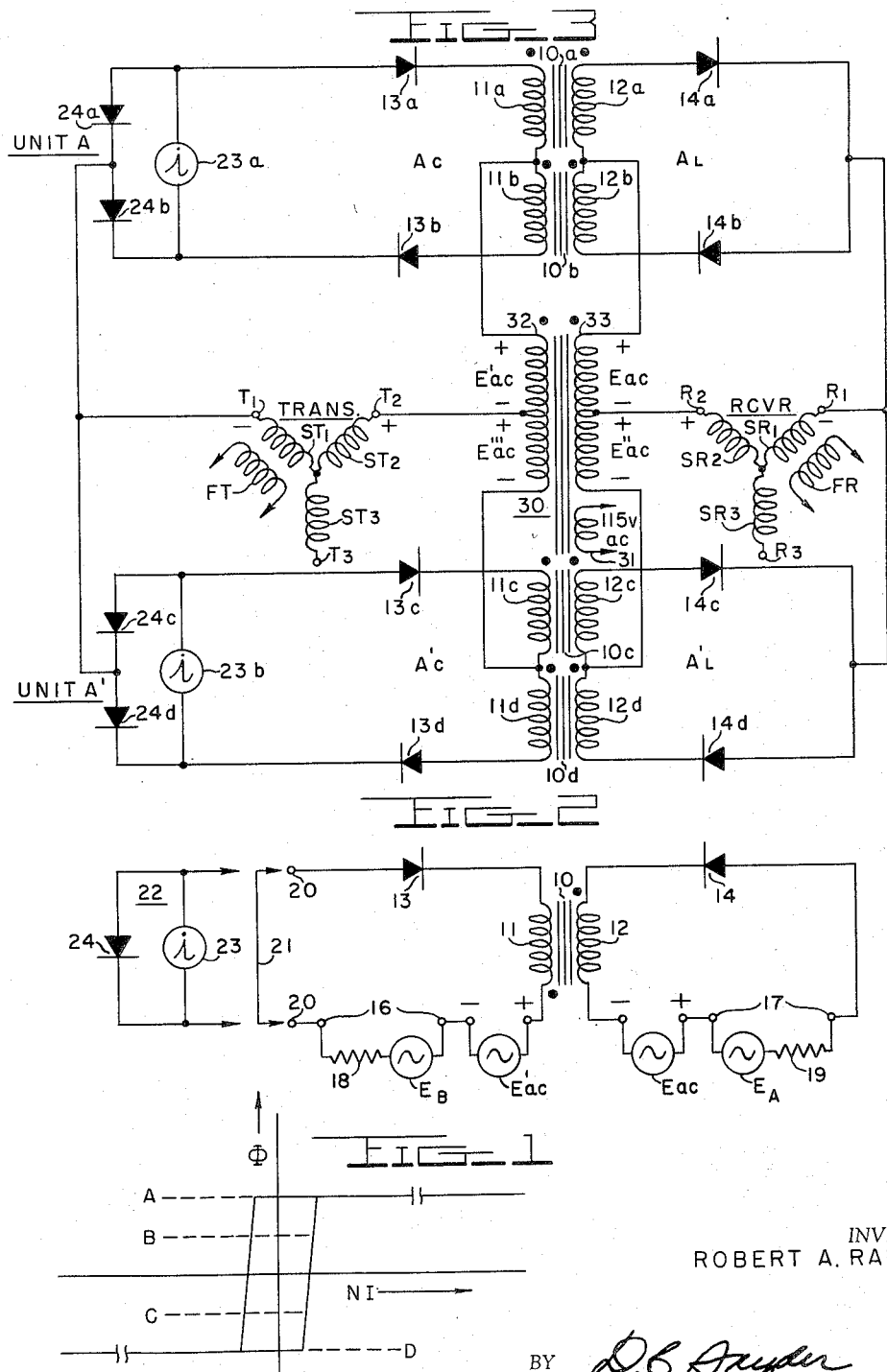

United States Patent Office 2,848,668
Patented Aug. 19, 1958

2,848,668

MAGNETIC ERROR SENSING CIRCUIT FOR SELSYN SYSTEMS

Robert A. Ramey, Jr., Library, Pa., assignor to the United States of America as represented by the Secretary of the Navy Application November 20, 1953, Serial No. 393,524

11 Claims. (Cl. 318—23.5)

(Granted under Title 35, U. S. Code (1952), sec. 266)

This invention relates in general to a magnetic amplifier having an error sensing characteristic and more specifically to a selsyn positioning system wherein the error signal generated by the selsyn transmitter is amplified by magnetic circuitry and passed to multiple selsyn receivers without appreciably loading the transmitter.

In many applications of the selsyn system one receiver only is utilized in conjunction with a selsyn transmitter, the rotor of which is driven by a reference shaft of substantial torque output. In many instances, however, it is desirable that the angular motion of the reference device be duplicated at a plurality of remote points thereby requiring a like number of receiver selsyns coupled to the single transmitter selsyn. Obviously the loading factor occasioned by the use of a plurality of receiving selsyns must be taken into account in the design of the transmitting portion of the system. In some instances the solution is simple; the transmitter would be designed with a capacity sufficient to drive all the receivers contemplated to be used in a system. There are serious disadvantages in such a system, however, which render it impractical where system flexibility and economic utilization of available space are of prime importance. Another disadvantage of such a system is that the torque output of sensitive devices, such as a gyro compass, the angular movement of which is to be reproduced at a plurality of remote points, is insufficient to drive a transmitter selsyn having a sufficiently large capacity to drive the plurality of receivers utilized in the system. Another solution which has been proposed is the coupling of the multiple receivers to the transmitter selsyn by an electronic amplifier, but in many military and industrial applications, the purpose to be served requires a system to possess a ruggedness and a stability with freedom from maintenance which are characteristics the electronic tube system does not have to the desired degree.

Accordingly, it is an object of the present invention to provide in a selsyn system a magnetic amplifier error sensing circuit which is rugged and stable with a low maintenance factor.

Another object of the present invention is to provide a flexible selsyn system having an amplifier coupling between the transmitter and multiple receivers thereof, the number of receivers being unlimited insofar as concerns the output capacity of the transmitter and reference prime mover elements.

A further object is to provide in a selsyn system having a single transmitter and multiple receiver devices a coupling amplifier which permits the utilization of as small a transmitter as desired without requiring more than an output equal to the static friction torque therefrom.

Still another object of the present invention is to provide in a selsyn system having single transmitter and a multiple receiver a magnetic coupling amplifier which prevents feed-back to the generator from spurious motor displacements.

A still further object is to provide a magnetic error sensing circuit which generates a power amplified signal that is proportional to the magnitudes of a pair of signals to be compared.

Still another object of the present invention is to provide a magnetic error sensing circuit which produces an output voltage dependent upon the relative magnitude and polarity of a pair of signals.

Other objects of the present invention will become apparent from the following detailed description when taken in conjunction with the drawings in which:

Fig. 1 illustrates a typical hysteresis curve for the high remanence saturation magnetic cores used in the present invention;

Fig. 2 is a schematic diagram of a simplified form of the magnetic error sensing circuit;

Fig. 3 is a schematic diagram of a magnetic error sensing circuit embodying the present invention;

Figure 4:
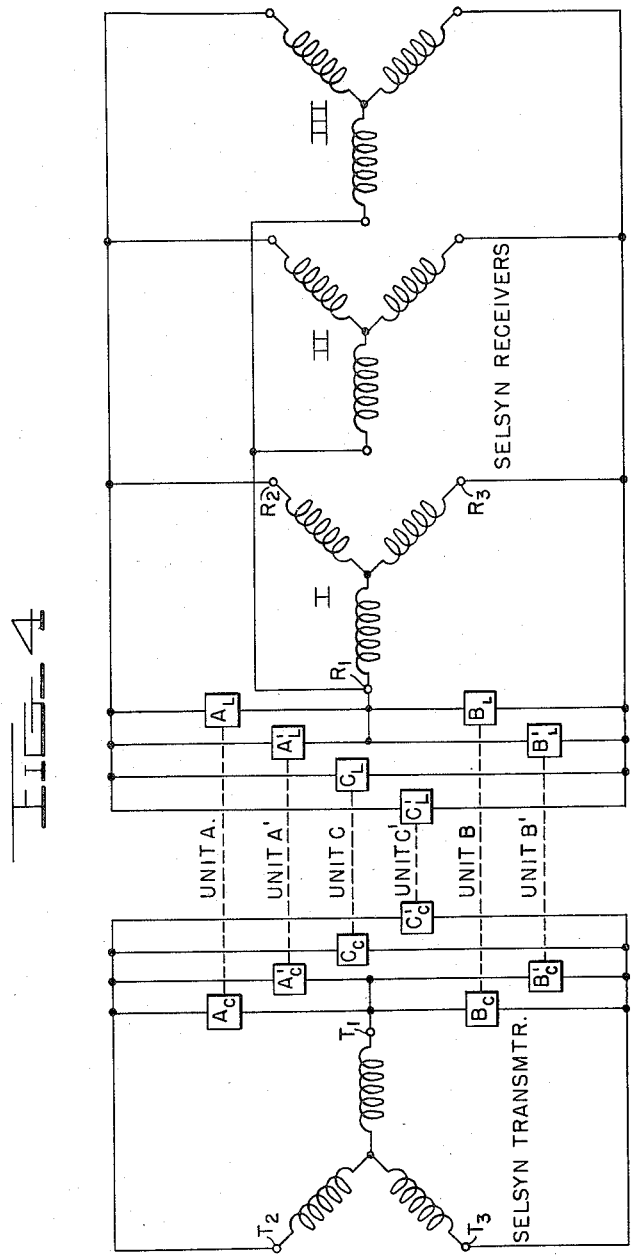
Fig. 4 is a block diagram illustrating the application of magnetic error sensing circuit to a selsyn system having a single transmitter and multiple receivers.

In my copending application, Ser. No. 237,813, filed July 20, 1951, now Patent No. 2,783,315, for Magnetic Amplifier Control Circuit, the theory is presented, that the characteristics of magnetic circuitry may best be predicted by considering such circuitry as being voltage sensitive. This theory follows from the principle that the level of magnetization of a core of saturable magnetic material may be determined uniquely from the equation $$e \text{ (volts)} = -N\frac{d\phi}{dt}$$

or where the turns $N=1$, $\phi=-\int e\,dt$ volt-seconds. Restating this principle, the magnetization level of a saturable magnetic core may be determined uniquely from a knowledge of the time-integral of reactive voltage developed across the winding wound around the core. In applying this principle to the design of magnetic circuitry the properties of the magnetic material employed must, of course, be also considered. With reference to Fig. 1 there is illustrated the general form of the hysteresis loop of the magnetic material used in the present invention, the abscissa being ampere-turns and the ordinates being flux $\phi$. As shown, the hysteresis loop, typical of such materials as Deltamax and Orthonol, is substantially rectangular with saturation at relatively low values of magnetomotive force.

Due to the high remanence properties of the selected material, the variations of the magnetization level, as represented by the abscissa in Fig. 1, of the core material may be easily predicted and controlled through an understanding of the behavior of magnetic material under the above-stated principles. For example, assuming that the previous history of the core is such that the magnetization level is initially at an arbitrary intermediate level designated at C, then an applied magnetomotive force taken as positive, will shift the said level, for example to B, towards saturation level A. The amount of the shift in the magnetization level is proportional to the time-integral of the reactive voltage developed across the core winding. The precise degree of shift is determinable since the time integral of reactive voltage is directly dependent on the known factors N, the number of winding turns, the magnitude and duration of the externally applied voltage, and the width of the hysteresis loop. Upon termination of the applied force, the magnetization level having been shifted to an arbitrarily selected level B, because of the high characteristic remanence the core will remain at the new magnetization level until further application of magnetomotive force. A like force applied in the negative sense, which may arise in accordance with the negative half-cycle of an applied alternating voltage, will theoretically reset the magnetization level of the core to level C.

An important consideration which should be understood is that the sole requirement for the externally applied voltage to move the magnetization level from level C to level B or to reset the magnetization level from level B to level C, this being the voltage waveform must have a time-integral equivalent to the volt-seconds represented by the difference (B—C) in core magnetization. The requirement may be satisfied whether the applied voltage is alternating or direct, and if alternating, regardless of the shape of the voltage envelopes. In the exemplified embodiments, to be described in connection with Figs. 2 through 4, it will be assumed for purposes of illustration that the external voltages applied to core windings are of same waveform and have the same frequency and phase. On a half-cycle basis of analyzing the circuit operation, therefore, the shift in magnetization level of the core will be proportional to amplitude since all other factors including winding turns, time, and hysteresis loop width are, or may be considered as, constants. The circuitry will be analyzed on this simplified basis.

Turning now to Fig. 2, there is shown a magnetic error sensing circuit of a simplified form which is useful in explaining the basic principles underlying the operation of the more complex forms of the present invention. The circuit includes a high remanence saturable magnetic core 10 having windings 11 and 12 wound thereon, these windings being referred to hereinafter as the demagnetizing or reset winding and the magnetizing or load winding respectively. The dots adjacent the ends of the windings refer to the relative polarity thereof. Alternating voltage supply sources $E'_{A.C.}$ and $E_{A.C.}$, usually of power line frequencies, are respectively provided to supply to windings 11 and 12 a core demagnetizing voltage and a core magnetizing voltage. These sources additionally constitute reference voltages to which a pair of signal voltages are to be respectively compared with the ultimate objective of detecting relative magnitude and polarity variation in the signals to be sensed. Unilateral impedance devices 13 and 14, shown as rectifiers, are connected in series with sources $E'_{A.C.}$ and $E_{A.C.}$ respectively and to poled in relation to source polarity that in one half-cycle of operation source $E'_{A.C.}$ supplies to winding 11 a half-wave demagnetizing voltage and in the next half-cycle source $E_{A.C.}$ supplies to winding 12 a half-wave magnetizing voltage. As a consequence, the effect of sources $E'_{A.C.}$ and $E_{A.C.}$ on core 10 will be that in successive half-cycles the core magnetization level will be alternately shifted towards and away from a given knee, for example, saturation level A, of the core hysteresis loop.

The relative magnitudes of voltages $E'_{A.C.}$ and $E_{A.C.}$ and the turns of windings 11 and 12 are subject to considerable design variation, but with the limitations imposed by the circuit that over a complete cycle of operation the time integral of demagnetizing voltage applied to winding 11 by source $E'_{A.C.}$ in one half-cycle must be substantially equal to the time-integral of magnetizing voltage applied to winding 12 by source $E_{A.C.}$ in the next half-cycle, and that in one half-cycle of full application of either source to the windings the capacity in volt-seconds of core 10 should not be exceeded. These limitations will be explained in detail hereinafter. Generally, sources $E'_{A.C.}$ and $E_{A.C.}$ will be of the same frequency and phase, and if the turns of windings 11 and 12 are chosen to be equal, will also be of equal magnitude under the foregoing conditions. Hence these voltages may be obtained from a single source appropriately coupled to the windings by conventional transformer connections.

Terminals 16 and 17 serve to couple signal sources $E_B$ and $E_A$ respectively in series with reference voltages $E'_{A.C.}$ and $E_{A.C.}$. Signal sources $E_B$ and $E_A$ comprise a pair of voltage generators, the outputs of which are to be compared for error both in polarity and magnitude, and are associated with output impedances 18 and 19 across one of which the output error signal of the circuit is developed. In some instances it is desired that such error signal be fed as a correction voltage directly to the signal generator which gives rise to the error, as will be explained for example more fully in connection with Fig. 3, the output impedances then representing the internal impedances of the respective generators. The output impedances may alternatively be external impedances from which the output error signal may be obtained and fed to any desired utilization device.

In general, generators $E_B$ and $E_A$ will be of the same frequency as reference source $E'_{A.C.}$ and $E_{A.C.}$, but may have independently variable magnitudes and relative polarity provided the maximum magnitudes thereof do not exceed the amplitude of reference voltages $E'_{A.C.}$ and $E_{A.C.}$.

Winding 12, rectifier 14, impedance 19 and voltage sources $E_{A.C.}$ and $E_A$ in series comprise the magnetizing or load portion of the error sensing circuit. The demagnetizing or reset circuit includes in series winding 11, rectifier 13, impedance 18, and voltage source $E'_{A.C.}$ and $E_B$. Also provided in the demagnetizing circuit are terminals 20 to which either shorting line 21, for bilateral error sensing operation, or a current limiter circuit generally designated at 22, which renders the circuit unilateral in characteristics, is coupled. The term "bilateral" is herein used to characterize an error sensing circuit which will develop an output signal either in the demagnetizing circuit at impedance 18 or in the magnetizing circuit at impedance 19 according to the relative magnitude and polarity of signal sources $E_A$ and $E_B$. Thus, depending upon the conditions which obtain, either the magnetizing or the demagnetizing circuit may be either the driven or the driving circuit. For unilateral operation, only the demagnetizing circuit, for example, may act as the driving circuit in which case error signals would be developed in the magnetizing circuit at impedance 19.

In the bilateral operation of the error sensing circuit, that is, when shorting line 21 is connected to terminals 20, assuming voltages $E_A$ and $E_B$ to be zero and the instantaneous polarities to be as shown in Figure 2, rectifier 13 blocks application of $E'_{A.C.}$ from winding 11 but rectifier 14 conducts to impress a half-cycle of voltage $E_{A.C.}$ on winding 12 whereby the magnetization level of core 10 will be shifted in one sense according to the time-integral of the applied voltage. In the next succeeding half-cycle, the polarities shown in Figure 2 are reversed and rectifier 14 blocks $E_{A.C.}$ from winding 12 but rectifier 13 conducts to impress a half-cycle of voltage on winding 11 whereby the magnetization level of core 10 will be shifted in an equal degree in the opposite sense. Since the capacity of core 10 in volt-seconds is chosen to exceed the time-integral over a half-cycle of either voltage $E'_{A.C.}$ or $E_{A.C.}$, the magnetization level fluctuates between two levels, for example between levels B and D. During such operation only magnetization current flows in the magnetizing and reset circuits, which current is of a very small value and is assumed negligible with respect to developing output voltage at impedances 18 and 19. In other words, since core 10 remains unsaturated, the impedance presented by windings 11 and 12 remains very high whereby substantially the entire reference voltages $E_{A.C.}$ and $E'_{A.C.}$ are absorbed in shifting the core magnetization level.

When signal voltages $E_B$ and $E_A$ are not zero, but possess independent magnitudes and relative polarities, then the error circuit operates in one of three possible conditions: (1) where signal voltages $E_B$ and $E_A$ are both opposite in polarity to reference voltages $E'_{A.C.}$ and $E_{A.C.}$ respectively; (2) where one of signal voltages $E_B$ or $E_A$ is opposite in polarity to its respective reference voltage $E'_{A.C.}$ or $E_{A.C.}$ while the other is of the same polarity; and (3) where both signal voltages have the same polarity as the reference voltages. Under condition (1) the voltage in the magnetizing circuit now effective to magnetize core 10 is the algebraic sum of voltage $E_{A.C.}$ and $E_A$, or $(E_{A.C.}-E_A)$, and likewise the effective demagnetizing voltage is $(E'_{A.C.}-E_B)$. When, as in the above assumed case, the reference voltages are equal and chosen to have a magnitude at least as great as the maximum magnitudes of the signal voltages, then the difference between the effective magnetizing and demagnetizing voltages will be equal to the output voltage of the circuit. Thus, on a voltage-time integral basis:

$$V_0 = |(E_{A.C.}-E_A)-(E'_{A.C.}-E_B)| = |E_B-E_A| \quad (1)$$

This result may be best illustrated graphically with reference to Figure 1. Arbitrarily chosing $E_b > E_a$ and assuming that in the demagnetizing half-cycle the effective voltage $(E'_{A.C.}-E_b)$ is equivalent to the volt-seconds sufficient to shift the core magnetization level from level A to level B, saturation of the core will occur in the magnetizing half-cycle inasmuch as the magnetizing voltage $$(E_{A.C.}-E_a)$$

represents a greater volt-second shift of the core magnetization level in the opposite sense. Therefore, if at the end of a demagnetizing half-cycle the magnetization level is set at B, saturation of the core occurs at an intermediate time in the magnetizing half-cycle determined by the time required to apply that portion of the magnetizing volt-seconds which is equal to the total effective demagnetizing volt-seconds. After core saturation the high reactance of the core winding becomes essentially zero whereby the remaining portion of the magnetizing half-cycle is available for application to the load, this remaining portion being the excess of magnetizing volt-seconds over demagnetizing volt-seconds as determined by Equation 1 above. At the end of the magnetizing half-cycle, the level of magnetization remains at level A and, for the assumed values, is reset at level B during the demagnetizing half-cycle to complete a full cycle of operation. The output voltage, under condition (1) and where $E_b > E_a$ is thus applied, after core 10 is saturated, through rectifier 14 and winding 12 to impedance 19. Similarly under condition (1) where $E_a > E_b$ an output proportional to $(E_a-E_b)$ is applied through winding 11 and rectifier 13 to impedance 18. Hence, in general, where both signal voltages are opposite in polarity to the reference voltages respectively an output proportional to the difference in signal voltage magnitudes is fed to the load impedance associated with the lesser signal voltage source.

A similar analysis for the second operating condition, wherein one signal voltage only is in polarity opposition with the associated reference voltage, will show the output of the circuit to be proportional to signal voltage sums $(E_a+E_b)$. For example, where $E_a$ is opposite in polarity to reference voltage $E_{A.C.}$, the equation for output is:

$$V_0 = |(E'_{A.C.}+E_b)-(E_{A.C.}-E_a)| = |E_b+E_a| \quad (2)$$

The output will appear, in the example, at impedance 18 inasmuch as the time-integral of $(E'_{A.C.}+E_B)$ must necessarily be larger than the time-integral of $(E_{A.C.}-E_A)$ whereby the difference in volt-seconds must be absorbed in the demagnetizing circuit after saturation of core 10 as described above. Continuing in the second operating condition where only $E_b$ is opposite in phase to its associated reference voltage, then an output equal to $E_b+E_a$ will appear across impedance 19.

A like result obtains when, under the third operating condition, both signal voltages have the same polarity as the respective reference voltages; that is, whichever combined signal and reference voltage has the larger time-integral will provide an excess of volt-seconds over the amount necessary for core saturation, the excess being absorbed by the associated load impedance. Generally, the equation for output is:

$$V_0 = |(E'_{A.C.}+E_b)-(E_{A.C.}+E_a)| = |E_b-E_a| \quad (3)$$

Thus, if $E_b > E_a$, an output proportional to the difference of the signal voltages will appear at impedance 18 in the demagnetizing half-cycle. Conversely, if $E_a > E_b$ then the output appears across impedance 19.

The error sensing circuit with shorting line 21 connected to terminals 20 is bilateral in nature since the output may appear at either output impedance 18 or 19 depending upon the relative magnitude and polarity of the signal voltages. For those applications where a unilateral characteristic is desirable, the circuit of Figure 2 may be modified to assure that output will be delivered only to one of the output impedances in either of the magnetizing or demagnetizing circuits. This may conveniently be accomplished by connecting to terminals 20 a current limiting circuit generally designated at 22 which restricts the magnitude of curent flow in the demagnetizing circuit to substantially the value of current required for demagnetizing core 10. The limiter includes a constant current source 23 in parallel with rectifier 24, the current source being arranged whereby current therefrom tends to flow though the demagnetizing circuit in the same sense as the normal flow of demagnetizing current. Rectifier 24 is poled to provide a low impedance path for the constant current from source 23. In operation, during magnetizing half-cycles the combined voltage $$(E'_{A.C.}\pm E_b)$$

is of the polarity to block conduction by rectifier 13 and hence to block the flow of constant current from the demagnetizing windings; the entire constant current thus flows through rectifier 24 during the magnetizing half cycle. In the demagnetizing half-cycle the voltage $$(E'_{A.C.}\pm E_b)$$

reverses in polarity and tends to drive current through the demagnetizing winding. The demagnetizing current actually appears as a decrease in the constant current flow through rectifier 24. Obviously the decrease in the value of the constant current passing through rectifier cannot exceed the value of the total constant current while the flow of demagnetizing current through source 23 cannot exceed the limiting value by definition.

In practice the constant current source 23 may take any of the conventional forms, for example, a small direct current source in series with a very large resistance, or a source of rectified alternating current in series with a high impedance will suffice.

Limiting the current in the demagnetizing circuit by use of the circuit 22 prevents development of output voltage at impedance 18 since the value of demagnetizing current required is negligibly small. The circuit therefore, has the limitations that the output derived therefrom is half-wave and in unilateral operation, no output is obtained during operating conditions (1) and (3) discussed above for those signal voltages which have a polarity and amplitude normally operative to cause the error signal to appear across resistance 18 in the demagnetizing circuit. That is, due to the limiting action of circuit 22 these error signals are suppressed. In Figure 3 an error sensing circuit is shown which produces full-wave output error signals whenever an amplitude or polarity difference in the signal voltages exists while yet retaining unilateral characteristics. In order best to illustrate the characteristics of the complete unilateral form of the error circuit, it will be now described in connection with a selsyn system wherein the circuit is utilized as an isolating amplifier for driving multiple receivers from a single transmitter selsyn.

In general, a representative selsyn system includes a transmitter unit and at least one receiver selsyn unit, each of the units being substantially similar and having a three-winding wye-connected stator and a single-phase field winding rotor. The rotor windings are all excited in parallel from a single-phase source, and the corresponding terminals of the stator windings are joined. Mechanical movement of the transmitter rotor alters the relationship of the induced voltages in the transmitter and receiver stator windings which causes circulating currents to pass through the receiver stator windings. The reaction of the flux associated with these circulating currents on the receiver field winding produces a torque which tends to position the receiver rotor according to the position of the transmitter rotor. As applied to such a system, the magnetic error sensing circuit functions to sense unbalance in the induced voltages in the transmitter and corresponding receiver stator windings and to supply proportional power to the receiver according to the power rating of the supply source rather than at the rating of the transmitter selsyn.

Referring with particularity to Figure 3 there is shown the stator windings $ST_1$, $ST_2$ and $ST_3$ connected in wye, which windings cooperate with the rotor field winding FT to form the windings of the transmitter device of the selsyn system. Similarly, wye-connected windings $SR_1$, $SR_2$ and $SR_3$ together with winding FR constitute the windings of a receiver device of the selsyn system. The field windings FT and FR, and the field windings of as many other receiver devices as desired, are connected in parallel to a suitable source of alternating current supply, not shown. In conventional practice corresponding stator winding terminal pairs, for example, the pair of terminals $T_1$ and $T_2$ for transmitter windings $ST_1$ and $ST_2$ and terminals $R_1$ and $R_2$ for receiver windings $SR_1$ and $SR_2$, are connected together. According to the present invention the exemplified terminal pairs are connected through error sensing amplifier which includes two units generally designated as unit $a$ in Fig. 3. Inasmuch as there are three such terminal pairs, being $T_1T_2$—$R_1R_2$, $T_1T_3$—$R_1R_3$ and $T_2T_3$—$R_2R_3$, there are three pairs of error circuits similar to that shown in Figure 3 as illustrated in block diagram form in Figure 4.

In Figure 3 winding 11a, blocking rectifier 13a, the constant current source including source 23a and rectifier 24a, reference voltage $E'_{A.C.}$ obtained from one-half of the center-tapped secondary winding 32 on power supply transformer generally designated at 30, and the selsyn transmitter terminal pair $T_1T_2$ which furnishes a first signal voltage, comprise a demagnetizing circuit; reference voltage $E_{A.C.}$ from one-half of center-tapped secondary winding 33, power supply 30, winding 12a, blocking rectifier 14a, and selsyn receiver terminal pair $R_1R_2$ which furnishes a second signal voltage, comprise a magnetizing circuit; and saturable core 10a on which windings 11a and 12a are wound, together form a half-wave unilateral error sensing circuit similar both in circuitry and in operation to that described in connection with Figure 2. In order to provide full-wave output from the circuit, the series connected signal and reference voltage sources in the half-wave circuit need only be paralleled by another identical, except for reverse connection of the blocking rectifiers, half-wave circuit which in Figure 3 comprises saturable core 10b having a demagnetizing circuit including winding 11b, blocking rectifier 13b, and rectifier 24b all in series with reference voltage $E'_{A.C.}$, and a magnetizing circuit including winding 12b and blocking rectifier 14b in series with reference voltage $E_{A.C.}$.

The paralleled half-wave circuits form the full-wave circuit, unit A, the demagnetizing and magnetizing circuits of which are generally designated at $A_c$ and $A_L$ respectively. In operation of the full-wave circuit, in any given half-cycle of the reference voltage, because of the assigned polarity of the blocking rectifiers, one of cores 10a or 10b is demagnetized while the other is magnetized to saturation, permitting output current to flow in accordance with the relative values of the signal voltages.

This action occurs, for example, in the half-cycle indicated by the instantaneous polarities of the reference voltages shown in Figure 3, as follows: The effective demagnetizing voltage, as represented by the terminal voltage of the transmitter selsyn combined with the reference voltage $E'_{A.C.}$, is applied through winding 11b, rectifier 13b and the constant current source to reset core 10b while in the magnetizing circuit the effective magnetizing voltage, as represented by the combination of the receiver selsyn terminal voltage appearing across terminals $R_2R_1$ and reference voltage $E_{A.C.}$, is applied through winding 12a and rectifier 14a to saturate core 10a. Should core 10a reach the saturation level prior to the end of the half-cycle, load current will flow in the magnetizing circuit $A_L$ through winding 12a and rectifier 14a resulting in output voltage being applied across the internal impedance of windings $SR_1$ and $SR_2$ of the receiver selsyn device. During this half-cycle rectifier 13a blocks demagnetizing current from winding 11a and rectifier 14b prevents application of magnetizing voltage to winding 12b. In the next succeeding half-cycle the polarities of reference voltages $E'_{A.C.}$ and $E_{A.C.}$ reverse as do the selsyn transmitter and receiver terminal voltages with the result the demagnetizing voltage is now applied to winding 11a through rectifier 13a to demagnetize core 10a while magnetizing voltage is applied to 12b through rectifier 14b. Rectifier 13b now blocks demagnetizing voltage from winding 11b and rectifier 14a blocks magnetizing voltage from winding 12a. Thus in each half-cycle of operation one of cores 10a or 10b is being magnetized and subject to saturation whereby load current and output voltage may be applied to the receiver selsyn windings.

In the bilateral circuit an output voltage may appear either in the demagnetizing or the magnetizing circuit in dependence upon the relative signal magnitudes and polarity. For the unilateral circuit of Fig. 2, however, output which would normally be produced at impedance 18 in the demagnetizing circuit is lost due to the action of the constant current circuit 22 as described. Returning now to Fig. 3 it is seen that the demagnetizing circuit $A_c$ includes the transmitter selsyn winding $ST_1$, $ST_2$ through which the flow of load or torque-producing current should obviously be prevented, hence the unilateral circuit is preferable for selsyn system applications of the present invention. But in order for the selsyn receiver to follow at all times the selsyn transmitter an output must be fed to the receiver whenever there is an error difference in the signal voltages, accordingly the loss of output referred to cannot be tolerated.

To provide output current to the receiver selsyn, when the conditions are such that load current would normally be expected to flow in the demagnetizing circuit $A_c$, while yet retaining the advantages of the unilateral circuit, there is also provided in the amplifier system an additional full wave error sensing circuit unit A'. Unit A' is connected in parallel with unit A across the selsyn terminal pairs $T_1T_2$ and $R_1R_2$, the units being similar except that the respective reference voltages are reversed in polarity with respect to terminals $T_1T_2$ and $R_1R_2$. Unit A' therefore includes a demagnetizing circuit $A'_c$ and a magnetizing circuit $A'_L$ which have elements similar to that of demagnetizing circuit $A_c$ and magnetizing circuit $A_L$ respectively, except that reference voltage $E'''_{A.C.}$ has a polarity relative to terminal $T_2$ opposite to that of reference voltage $E'_{A.C.}$, and likewise voltage $E''_{A.C.}$ has a relative polarity opposite to that of voltage $E_{A.C.}$. Although reference voltage $E'''_{A.C.}$ and $E''_{A.C.}$ may be obtained from independent sources, these voltages are conveniently derived from the other halfs of the center-tapped secondary windings 32 and 33 of power supply 30 as will be explained.

The operation of the complete system may be best illustrated with reference to the equations of operations set forth above. Assuming the signal voltages and the reference voltages have the instantaneous polarities as shown, unit A will operate during the indicated half-cycle in accordance with Equation 3 since the transmitter and receiver selsyn signal voltages are in polarity additive relative to reference voltages $E'_{A.C.}$ and $E_{A.C.}$ respectively. In order for unit A to provide output current through the magnetizing circuit and receiver selsyn windings, it is necessary for the receiver signal voltages to be larger than the transmitter voltages as described. An examination of unit A' will show that the transmitter and receiver signal voltages are both in polarity opposition relative to reference voltages $E'''_{A.C.}$ and $E''_{A.C.}$, in which case unit A' operates in accordance wit Equation 1 above. As stated in connection with Equation 1 output current tends to flow in the magnetizing circuit only when the signal voltages associated therewith are less in magnitude than the signal voltage associated with the demagnetizing circuit. Hence, when there is a difference between the transmitter and receiver voltages, regardless of relative magnitude or polarity, an output current is caused to flow through the receiver selsyn windings either through magnetizing circuit $A'_L$ when the receiver terminal voltage is greater or through magnetizing circuit $A_L$ when the transmitter terminal voltage is greater. In either case the output will be proportional to the difference in the signal voltages as determined by Equations 1 and 3.

It should be noted that regardless of which unit provides the output the direction of current flow through the receiver selsyn windings will be in the same direction as though the transmitter and receiver terminal pairs were direct connected as in conventional selsyn practice. Hence, the torque produced by virtue of current flowing through the receiver device is always in the proper direction to tend to produce alignment of the transmitter and receiver rotors, and upon alignment the system voltages become balanced and no further output is developed.

The reference voltages as described may simply be derived from a power transformer 30 having a primary winding 31 connected to the same source of power, not shown, and a pair of center-tapped secondary windings 32 and 33. With terminal $T_2$ of the transmitter selsyn being connected to the center-tap of secondary winding 32 of transformer 30, the voltage existing across one half of winding 32 will be of one polarity relative to the transmitter signal voltage while the voltage existing across the other half of winding 32 will be of the opposite polarity, whereby the reference voltages $E'_{A.C.}$ and $E'''_{A.C.}$ will have the proper polarities to produce the operation described. Likewise the pair of voltages $E_{A.C.}$ and $E''_{A.C.}$ have the proper polarity with respect to the receiver signal voltage when the center-tap of winding 33 is connected to terminal $R_2$. In this connection the frequency of the power supply connected to winding 31 will be the same in both frequency and phase as the source supplying armature field windings FT and FR of the selsyn whereby the selsyn field voltages may be also derived from power supply transformer 30 by the addition of another secondary winding thereto.

Figure 4 illustrates more completely the arrangement of the various amplifier units of the error sensing circuit when applied to the selsyn system. As shown error sensing units A and A', which are the same as described in connection with Figure 3, provide for amplifying the relative voltage difference existing between transmitter terminals $T_1T_2$ and receiver terminals $R_1R_2$. Similar units B and B' and units C and C', identical to units A and A' respectively, provide a like function for the voltage changes which occur between transmitter terminals $T_1T_3$ and receiver terminals $R_1R_3$, and transmitter terminals $T_2T_3$ and receiver terminals $R_2R_3$ respectively.

It is important to note that the power supplied to the selsyn receiver is not delivered thereto through the selsyn transmitter, the receiver and transmitter being electrically isolated. Hence, the power which may be fed to the selsyn receiver is not limited by the capacity of the selsyn transmitter, but rather the delivered power is limited only by the power rating of the source connected to the supply transformer 30, which rating may be as high as desired without effecting the size of the selsyn transmitter. Thus as many selsyn receivers may be connected in parallel in the magnetizing circuit of the error sensing device as the power rating of the supply source will permit, there being three such receivers shown in Figure 4. Another highly important feature of the present invention is the fact that the selsyn transmitter is not required to deliver power to the error sensing circuit, but may actually absorb power. Accordingly, where the transmitter selsyn controls a large number of receivers, the rating and size of the transmitter selsyn may be very small while the receivers may be large units capable of driving heavy loads. For example, a delicate instrument such as a gyro compass may control through a small selsyn transmitter the rotation of many heavy duty shafts driven by receiver selsyns of large capacity.

In designing the error sensing circuit for application to a selsyn system, the volt-second capacity of the saturable cores is also an important consideration. Preferably, the capacity of the various cores for example, core 10a, is chosen to correspond in volt-seconds to the time-integral over a half-cycle of the maximum terminal voltage of the selsyn transmitter added to the time-integral of a half-cycle of reference voltage $E'_{A.C.}$. In other words, the capacity of core 10a should be such that application of maximum effective demagnetizing voltage as represented by reference voltage $E'_{A.C.}$ added to the maximum transmitter signal voltage, will in one half-cycle be just sufficient to cause the magnetization level of core 10a to move from one knee of the hysteresis loop to the other. The core capacity could be decreased so as to equal in volt-seconds the time-integral of the reference voltage $E'_{A.C.}$ only, which would tend to improve the speed of response characteristics of the selsyn system. Reducing the core capacity, however, has the disadvantage of causing proportionately larger quiescent currents to flow in the selsyn receivers. In actual practice a small value of quiescent current flow is desirable in order to predispose of receiver static friction when a change in transmitter voltage does occur, which suggests a decrease in core capacity, however it is preferable that the core capacity remain high. Choosing the magnetizing voltage to be of a slightly greater magnitude than the demagnetizing voltage also results in quiescent current flow and is preferred to decreasing the volt-second capacity of the cores.

Although certain specific embodiments have been shown and described, many modifications and variations may be made by those skilled in the art without departing from the spirit of the present invention which is not to be limited except insofar as is necessary by the scope of the disclosure.

The invention described herein may be manufactured and used by or for the Government of the United States of America for governmental purposes without the payment of any royalties thereon or therefor.

What is claimed is:

1. In a selsyn positioning system which includes a transmitter selsyn and at least one receiver selsyn, said selsyns producing respective output alternating voltages indicative of the angular position of the rotors thereof, a reset type magnetic amplifier coupling said transmitter and receiver selsyns and responsive to a difference in the time-integral of said respective output voltages to supply power to said receiver selsyn for repositioning thereof.

2. In a selsyn positioning system which includes a transmitter selsyn and at least one receiver selsyn, said selsyns producing respective output alternating voltages indicative of the angular position of the rotors thereof, a reset type magnetic amplifier having first and second units coupling said transmitter and receiver selsyns, said first unit being responsive to a time-integral difference of a given sense in said respective output voltages to supply torque-producing output current to said receiver selsyn, and said second unit being responsive to a time-integral difference in said respective output voltages of a sense opposite to said given sense to supply counter-torque producing current to said receiver selsyn.

3. In a selsyn positioning system which includes a transmitter selsyn and at least one receiver selsyn, said selsyns producing respective output alternating voltages indicative of the angular position of the rotors thereof, a reset type magnetic amplifier having first and second units coupling said transmitter and receiver selsyns, first and second reference alternating voltage sources in each of said units, said transmitter and receiver voltages being combined with said first and second reference voltages respectively to derive control and load voltages respectively for each said units, the reference voltages in said first unit being of opposite polarity with the reference voltages in said second unit relative to said selsyn output voltages, means in said first unit responsive to a time-integral difference of a given sense in the control and load voltages therein to cause torque producing current to flow in said receiver selsyn, and means in said second unit responsive to a time-integral difference in the control and load voltages therein of a sense opposite to said given sense to cause counter-torque producing current to flow in said receiver selsyn.

4. In a selsyn system, a reset type magnetic amplifier coupling the three-winding output circuits of the transmitter and receiver selsyns and comprising a first and second amplifier units coupled between each transmitter circuit terminal pair and the corresponding receiver circuit terminal pair; each unit comprising a pair of saturable magnetic cores each having a load and a control winding wound thereon, a magnetizing and a demagnetizing alternating voltage source, means for applying said magnetizing source to said load windings in alternation and said demagnetizing source to said control windings in alternation and said sources in alternation to the respective windings on each of said cores, means for limiting the flow of current through said control windings to approximately the magnetizing current of said cores, a transmitter and a receiver terminal pair connected in series with said demagnetizing and magnetizing sources respectively; the voltage sources in said first and second units being of opposite polarity with respect to the associated terminal pairs.

5. A magnetic amplifier system for selsyn positioning which includes first and second reset type magnetic amplifier units coupling each transmitter selsyn three winding circuit terminal pair to the corresponding receiver selsyn terminal pair; each of said units comprising a pair of saturable magnetic cores, each core having a load and a control winding wound thereon, a magnetizing and a demagnetizing alternating voltage source coupled to the load and control windings respectively, unilateral impedance means arranged in said unit to cause application of said sources in alternation to the windings respectively associated with each source and in alternation to the windings on each core, means coupled to the control windings for limiting the flow of current therethrough to approximately the magnetizing current of said cores, a transmitter and a receiver terminal pair connected in series with said demagnetizing and magnetizing sources respectively; the magnetizing and demagnetizing sources in said first unit being of opposite instantaneous polarity with respect to the magnetizing and demagnetizing sources in said second unit.

6. In a selsyn system which includes at least one transmitter selsyn and a plurality of receiver selsyns connected in parallel; a reset type magnetic amplifier coupling the three-winding circuit of said transmitter to the paralleled three-winding circuits of said receivers comprising a first and a second amplifier unit coupling between each transmitter circuit terminal pair and the corresponding receiver circuit terminal pair; each unit comprising a pair of saturable magnetic cores, each core having a load and a control winding wound thereon, a magnetizing and a demagnetizing alternating voltage source coupled in parallel with said load and control windings respectively, unilateral impedance means arranged in said unit to cause application of said sources in alternation to the windings respectively associated with each source and in alternation to the windings on each core, a constant current source coupled to said control winding for limiting the current flow therethrough to approximately the magnetizing current of said cores, a transmitter and a receiver terminal pair connected in series with said demagnetizing and magnetizing sources respectively; the magnetizing and demagnetizing sources in said first unit being of opposite instantaneous polarity with respect to the magnetizing and demagnetizing sources in said second unit.

7. An error sensing circuit for producing an output dependent upon the relative magnitude and polarity of a pair of alternating voltages comprising a high remanence saturable magnetic core, circuit means for alternately magnetizing and demagnetizing said core including a magnetizing alternating voltage source and a demagnetizing alternating voltage source, and means coupling said pair of voltages in series with said magnetizing and demagnetizing voltage sources respectively for altering the effectiveness thereof to magnetize and demagnetize said core.

8. An error sensing circuit for generating an output voltage of a magnitude dependent upon the relative magnitude and polarity of a pair of voltages to be sensed comprising a high remanence saturable magnetic core, means for alternately magnetizing and demagnetizing alternating voltage source, said magnetizing source being coupled in series with one and said demagnetizing source being coupled in series with the other of said pair of voltages, and an output impedance in series with each of said sources.

9. An error sensing circuit for generating an output voltage of a magnitude dependent upon the relative magnitude and polarity of a pair of voltages to be sensed comprising a high remanence saturable magnetic core having a magnetizing and a demagnetizing winding wound thereon, means including a magnetizing and a demagnetizing alternating voltage source coupled to said magnetizing and demagnetizing windings respectively for alternately magnetizing and demagnetizing said core, one of said pair of voltages being coupled in series with said magnetizing source and the other in series with said demagnetizing source, means for limiting current flow through said demagnetizing winding to substantially the core magnetizing current, and an output impedance in series with said magnetizing winding.

10. An error sensing circuit for generating an output voltage of a magnitude dependent upon the relative magnitude and polarity of a pair of voltages to be sensed comprising a high remanence saturable magnetic core having a magnetizing and a demagnetizing winding wound thereon, respective alternating voltage sources in series with said magnetizing and demagnetizing windings being effective thereby to magnetize and demagnetize said core, one of said pair of voltages being coupled in series with said magnetizing source and the other in series with said demagnetizing source, unilateral impedance means arranged in said circuit for rendering said respective sources alternately effective, and a constant current source coupled in said demagnetizing circuit for limiting current flow therethrough to substantially the magnetizing current of said core.

11. An error sensing circuit for generating an output voltage of a magnitude dependent upon the relative magnitude and polarity of a pair of voltages to be sensed comprising first and second circuit units; each unit including at least one saturable magnetic core having a magnetizing and a demagnetizing winding wound thereon, a magnetizing and a demagnetizing alternating voltage source coupled to said magnetizing and demagnetizing windings respectively, means for applying said sources to said respective windings in alternation, means for limiting the current flow through said demagnetizing winding to substantially magnetizing current of said core, one of said pair of voltages being in series with said magnetizing source and the other of said voltages being in series with said demagnetizing source; an output impedance coupled in series with said one voltage; the magnetizing and demagnetizing sources in said first unit being of opposite polarity with respect to said magnetizing and demagnetizing sources in said second unit relative to said pair of voltages.

References Cited in the file of this patent

UNITED STATES PATENTS

| | | |
|---|---|---|
| 1,564,788 | Hildebrand | Dec. 8, 1925 |
| 2,534,293 | Newton | Dec. 19, 1950 |
| 2,554,203 | Morgan | May 22, 1951 |
| 2,715,203 | Morgan | Aug. 9, 1955 |
| 2,734,165 | Lufcy etal. | Feb. 7, 1956 |

OTHER REFERENCES

Three Phase High-Speed Magnetic Amplifier, A. E. Maine, Electronic Engineer, December 1954, pp. 514–517.